US006957330B1

(12) United States Patent
Hughes

(10) Patent No.: US 6,957,330 B1
(45) Date of Patent: Oct. 18, 2005

(54) METHOD AND SYSTEM FOR SECURE INFORMATION HANDLING

(75) Inventor: James P. Hughes, Lino Lakes, MN (US)

(73) Assignee: Storage Technology Corporation, Louisville, CO (US)

(*) Notice: Subject to any disclaimer, the term of this patent is extended or adjusted under 35 U.S.C. 154(b) by 688 days.

(21) Appl. No.: 09/260,796

(22) Filed: Mar. 1, 1999

(51) Int. Cl.[7] ............................. H04L 9/32; G06F 12/14
(52) U.S. Cl. ....................... 713/163; 713/162; 713/182; 713/193
(58) Field of Search ................................ 713/162, 163, 713/165, 182, 183, 184, 193, 200, 201, 202; 380/279, 282, 286; 705/52, 54

(56) References Cited

U.S. PATENT DOCUMENTS

| 3,798,360 | A | * | 3/1974 | Feistel | 178/22 |
| 4,200,770 | A | | 4/1980 | Hellman et al. | 178/22 |
| 4,405,829 | A | | 9/1983 | Rivest et al. | 178/22.1 |
| 4,757,543 | A | | 7/1988 | Tamada et al. | 380/51 |
| 5,113,442 | A | | 5/1992 | Moir | 380/25 |
| 5,214,703 | A | | 5/1993 | Massey et al. | 380/37 |
| 5,495,533 | A | | 2/1996 | Linehan et al. | 380/21 |
| 5,550,976 | A | | 8/1996 | Henderson et al. | 395/200.06 |
| 5,560,008 | A | | 9/1996 | Johnson et al. | 395/650 |
| 5,584,023 | A | | 12/1996 | Hsu | 395/620 |
| 5,588,060 | A | | 12/1996 | Aziz | 380/30 |
| 5,633,933 | A | | 5/1997 | Aziz | 380/30 |
| 5,649,185 | A | | 7/1997 | Antognini et al. | 395/609 |
| 5,696,898 | A | | 12/1997 | Baker et al. | 395/187.01 |
| 5,724,427 | A | | 3/1998 | Reeds, III | 380/25 |
| 5,724,428 | A | | 3/1998 | Rivest | 380/37 |
| 5,781,633 | A | | 7/1998 | Tribble et al. | 380/25 |
| 5,787,169 | A | | 7/1998 | Eldrige et al. | 380/4 |
| 5,787,175 | A | | 7/1998 | Carter | 380/25 |
| 5,796,825 | A | | 8/1998 | McDonnal et al. | 380/4 |
| 5,835,600 | A | | 11/1998 | Rivest | 380/44 |
| 6,266,420 | B1 | * | 7/2001 | Langford et al. | 380/282 |

FOREIGN PATENT DOCUMENTS

| EP | 0 895 149 A1 | 2/1999 | G06F 1/00 |
| WO | WO 9843425 A1 * | 10/1998 | H04N 07/16 |

OTHER PUBLICATIONS

Business Wire, "Process Software Corp. Announces Web Server for Windows NT," Feb. 7, 1995, The Gale Group, DIALOG File 649, Accession No. 01995145.*
PR Newswire Association, Inc., "Process Software Announces New World Wide Web Server; Purveyor Encrypt Webserver Provides Encryption for Business Transactions," Oct. 30, 1995, PR Newswired Association, Inc., DIALOG File 813, Accession No. 0876816.*
Bruce Schneier, Applied Cryptography, Second Edition, Protocols, Algorithms, and Source Code in C, Chapter 3, pp. 70-73, 1996.

* cited by examiner

Primary Examiner—Justin T. Darrow
(74) Attorney, Agent, or Firm—Brooks Kushman P.C.

(57) ABSTRACT

Information that must remain secure is often stored on untrusted storage devices. To increase security, this information is encrypted by an encryption value prior to storing on the untrusted storage device. The encryption value itself is then encrypted. The encryption value is decrypted by correctly solving an access formula describing a function of groups. Each group includes a list of at least one consumer client. A requesting consumer client is granted access to the information if the requesting consumer client is a member of at least one group which correctly solves the access formula.

17 Claims, 8 Drawing Sheets

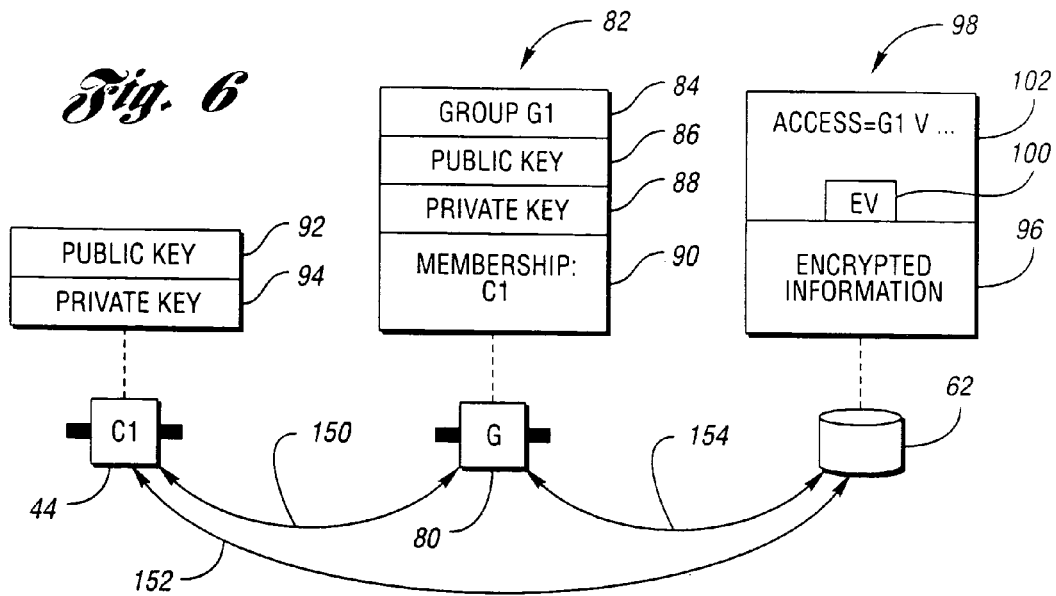
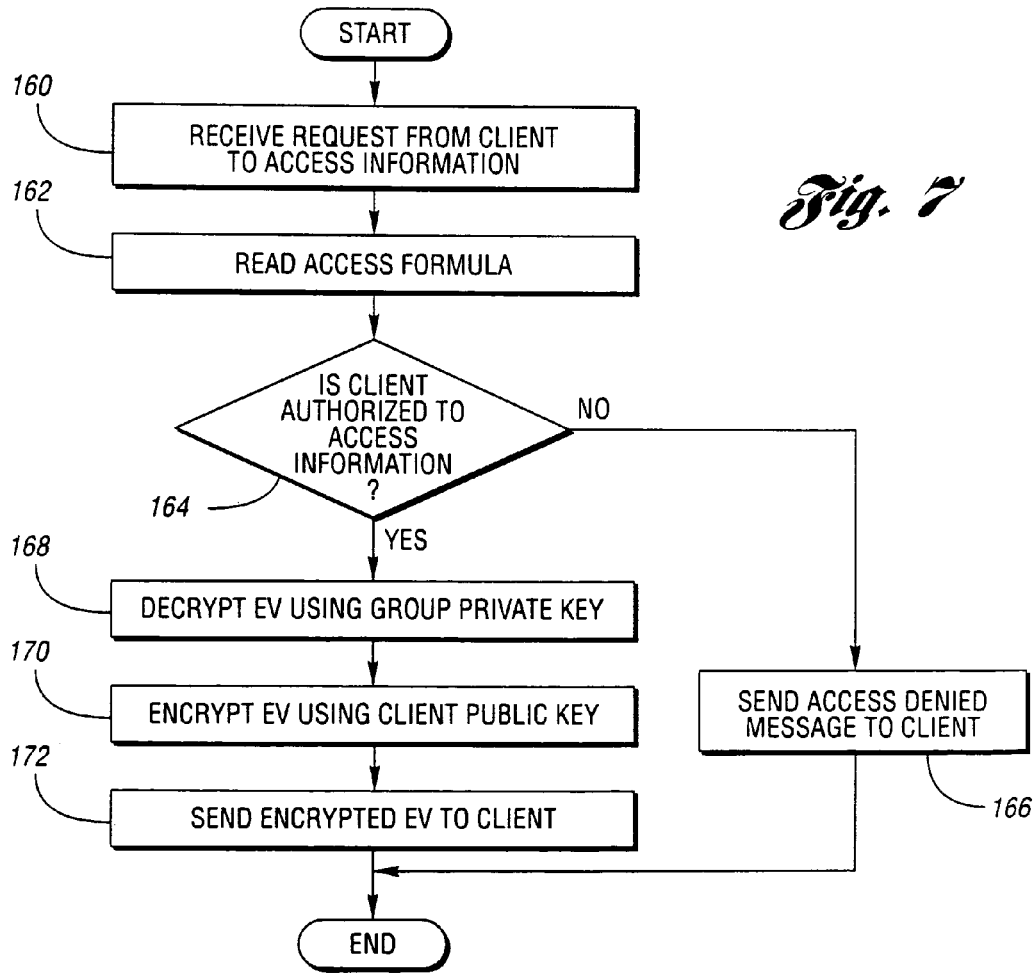

METHOD AND SYSTEM FOR SECURE INFORMATION HANDLING

TECHNICAL FIELD

The present invention relates to securely storing and retrieving information kept on untrusted storage devices.

BACKGROUND ART

Increasingly, information produced by one client must be shared by other clients connected through a computer network. The information may be kept on one or more storage systems also connected to the network. Such networks often interconnect many clients throughout an organization, some of whom are excluded from access to the information. The network may also support connections to public networks, such as the Internet, providing the possibility of unauthorized access from outside of the organization.

Storage systems used to hold shared information may include disk arrays for short term, high speed access of information, tape management systems for long term, high volume storage, and other types of storage devices. Such storage systems are often managed by centralized information systems groups which neither produce nor consume the information. These information systems groups are responsible for the security and integrity of information stored within the storage systems, and often have access to the stored information.

In order to protect information from being accessed by a client outside of an organization, a firewall may be placed between the organization's network and an external network. The firewall limits the types of information that may enter and exit the organization's network. While providing some level of protection from external access, the firewall will not protect stored information from access by an excluded client within the organization. Servers or hosts may be used to limit information access within the organization's network. However, the host manager may still have access to the information protected by the host.

Certain types of information produced and used within an organization must be kept secure. This information includes financial figures, personnel data, health information, business plans, trade secrets, and the like. A client producing such information should be able to store this information in an untrusted storage device in a manner that permits authorized clients to access the information while denying access to all others, including host managers and information systems personnel.

One method to protect information is to encrypt the information using a key and then store the encrypted information as a data set on one or more untrusted storage devices. Two types of encryption may be used, symmetric and asymmetric. In symmetric encryption, the same key is used to encrypt and decrypt the information. Various types of symmetric encryption which are known in the art include the Data Encryption Standard (DES) algorithm as described in Federal Information Processing Standard Publication 46-1; the Improved DES (IDES) algorithm as described in U.S. Pat. No. 5,214,703 titled "Device For The Conversion Of A Digital Block And Use Of Same"; and the RC-5 algorithm as described in U.S. Pat. Nos. 5,724,428 and 5,835,600 both titled "Block Encryption Algorithm With Data-Dependent Rotations"; each of which is incorporated herein by reference.

In asymmetric encryption, a first key is used to encrypt the information and a second key is used to decrypt the information. Typically, the first key is a public key which is widely known and the second key is a private key which is known only to authorized clients. Various forms of asymmetric encryption are known in the art, including the Diffie-Hellmean algorithm as described in U.S. Pat. No. 4,200,770 titled "Cryptographic Apparatus And Method"; and U.S. Pat. No. 4,405,829 titled "Cryptographic Communications System And Method"; each of which is incorporated by reference herein. In order to share encrypted information, the key or keys must be known to all clients for which access has been granted. This creates several difficulties. First, if authorization is to be removed from a client, the information must be reencrypted using a new key unknown to the excluded client. Second, it may be difficult to implement complex combinations of clients and groups of clients.

Another possible solution is to encrypt the information into a data set as above and to create a prefix associated with the data set that contains a listing of each client authorized to access the information contained in the data set. The public key for each client is used by a host to encrypt the key required to decrypt the data set. The encrypted data set key for each client to which access is granted is also stored in the prefix. Several difficulties arise with this technique. First, the association of a prefix with a data set implies that the prefix and data set should be placed together in long term storage. This means that the storage device holding the prefix must be accessed in order to change the listing of clients authorized to access the information. In the case of backup or archiving to, for example, magnet tape, the tape must be obtained and loaded before the access list can be modified. A second difficulty arises if a client is to be added to the list of authorized clients in the prefix once the prefix has been created. In order to add a client, the private key for an authorized client must be obtained, the data set encryption key decrypted using the private key, and the data set encryption key reencrypted using the public key of the new client. A first implementation option is to permit new clients to be added only by an existing client, restricting access control onto to existing clients. A second option is to have an authorized client surrender its private key, creating a potential breach in security. A third difficulty arises in projects where a group of clients may have to access thousands of information sets, such as with software development. Changing authorization may require accessing the prefix for each information set. A fourth difficulty arises in attempting to implement combinations of client groups, such as granting access to any client which is a member of a first group or a member of a second group.

What is needed is the ability to store secure information on one or more untrusted storage devices that allows flexibility in controlling access to the information. Access should be permitted based on combinations of client groups. Membership in these groups should be modifiable without requiring access to the storage device containing the encrypted information. Information should be encrypted before leaving a producer client and should stay encrypted until received by a consumer client.

DISCLOSURE OF INVENTION

It is an object of the present invention to provide for storing secure information on untrusted storage systems.

Another object of the present invention to provide for controlling access to secure information based on combinations of client membership in groups.

Still another object of the present invention to provide for modifying access to secure information even if the media on which the secure information is stored is not available.

Yet another object of the present invention to provide for securely storing encrypted information and the key to decrypt the information in the same data set.

A further object of the present invention to provide for protection of secure information at the information source.

In carrying out the above objects and other objects and features of the present invention, a method is provided for the secure handling of information encrypted to a data set and stored on at least one storage device. The method includes decrypting a value required to decrypt the information. The value is decrypted by correctly solving an access formula describing a function of groups, each group including a list of consumer clients. A requesting consumer client is granted access to the information if the consumer client is a member of at least one group which correctly solves the access formula. In a refinement, the encrypted value and the access formula are stored as metadata in the data set.

A method is also provided for the secure handling of information by clients using untrusted storage devices, each client connected to the storage devices using a network. The network also has a key manager for issuing private key and public key matched pairs. The method includes creating at least one group with each group including a list of at least one consumer client. A public key and a matched private key is acquired for each group. An information set is encrypted to produce a data set, the encryption based on a randomly generated number. An access formula expressing logical combination of at least one group for which access to the information set will be granted is determined. The solution of the access formula by at least one solution group indicates that a consumer client belonging to a solution group may access the encrypted information set. The randomly generated number is encrypted using the access formula and the public key for each group granted access to the information set. The encrypted randomly generated number is added to the data set. The data set is stored on one or more untrusted storage devices.

In an embodiment of the present invention, a consumer client has a public key and a matched private key. The method further includes receiving a request from the consumer client. A check is made to determine if the consumer client belongs to at least one solution group which solves the access formula. If not, access is denied. Otherwise, the randomly generated number is decrypted using the private key for the at least one determined solution group. The randomly generated number is then encrypted using the public key for the consumer client thereby permitting access to the encrypted information set by the consumer client.

In another embodiment of the present invention, all attempts to access the information set are recorded in an audit trail which includes an indication of the consumer client requesting access.

In still another embodiment of the present invention having a plurality of groups which form a solution to the access formula, encrypting the randomly generated number creates an encrypted partial key for each group. Each partial key is encrypted using the public key for one group. Each partial key is required to decrypt the encrypted randomly generated number. When access is granted, the encrypted partial key is decrypted using the private key for each group. The decrypted partial key is reencrypted using the public key for a requesting client. The requesting client decrypts each reencrypted partial key using its private key. The randomly generated number is then determined based on each partial key and the information set is decrypted using the determined randomly generated number.

In yet another embodiment of the present invention, the access formula is a boolean combination of groups. A group asserts true in the boolean combination when a consumer client member of the group requests access to the information set protected by the access formula. The consumer client group member is granted access if the access formula results in true.

In a still further embodiment of the present invention, the method further includes determining that an information set destined for storage on an untrusted storage device is encrypted. If the information set is determined to be not encrypted, storage on the untrusted storage device is prohibited.

A system is also provided for the secure handling of information stored on an at least one untrusted storage device connected to a network. The system includes a key manager connected to the network. The key manager generates private key and public key matched pairs for use with an asymmetric encryption and decryption scheme. The system also includes at least one group server connected to the network. Each group server maintains at least one group. Each group includes a list of client members allowed access to information produced by any client member of the group. A private key and matched public key are obtained for each group. The system further includes at least one producer client connected to the network. The producer client encrypts an information set to produce a data set based on an encryption value. An access formula expressing logical combination of at least one group for which access to the information set will be granted is determined. The encryption value is asymmetrically encrypted using the determined access formula and the public key for each group for which access to the information set may be granted. The encrypted encryption value and the access formula are added to the data set. The data set is stored on at least one untrusted storage device. In a refinement, the encryption value is a randomly generated number.

In an embodiment of the present invention, the system further includes at least one consumer client connected to the network. Each consumer client obtains a private key and a matched public key. When access to secure information is desired, the data set containing the encryption information is accessed. A check is made to determine at least one group server maintaining at least one group forming a solution to the access formula. A request is sent to access the encrypted information set to each of the determined group servers. If access is granted from each of the determined group servers, the encryption value is decrypted using the client private key. The information set is then decrypted using the decrypted encryption value.

In yet another embodiment of the present invention, each group server can receive a request from a requesting consumer client. A check is made to determine if the requesting consumer client belongs to at least one solution group which solves the access formula. If not, access is denied. Otherwise, the encryption value is decrypted using the private key for the determined solution group. The encryption value is reencrypted using the public key for the requesting consumer client thereby permitting access to the encrypted information set by the consumer client.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 6 is a schematic diagram of a consumer client, a group server supporting a group to which the consumer client is a member, and an untrusted storage device holding information that may be accessed by members of the group;

FIG. 7 is a flow diagram illustrating operation of a group server in response to an access request according to an embodiment of the present invention;

BEST MODE FOR CARRYING OUT THE INVENTION

Figure 1:
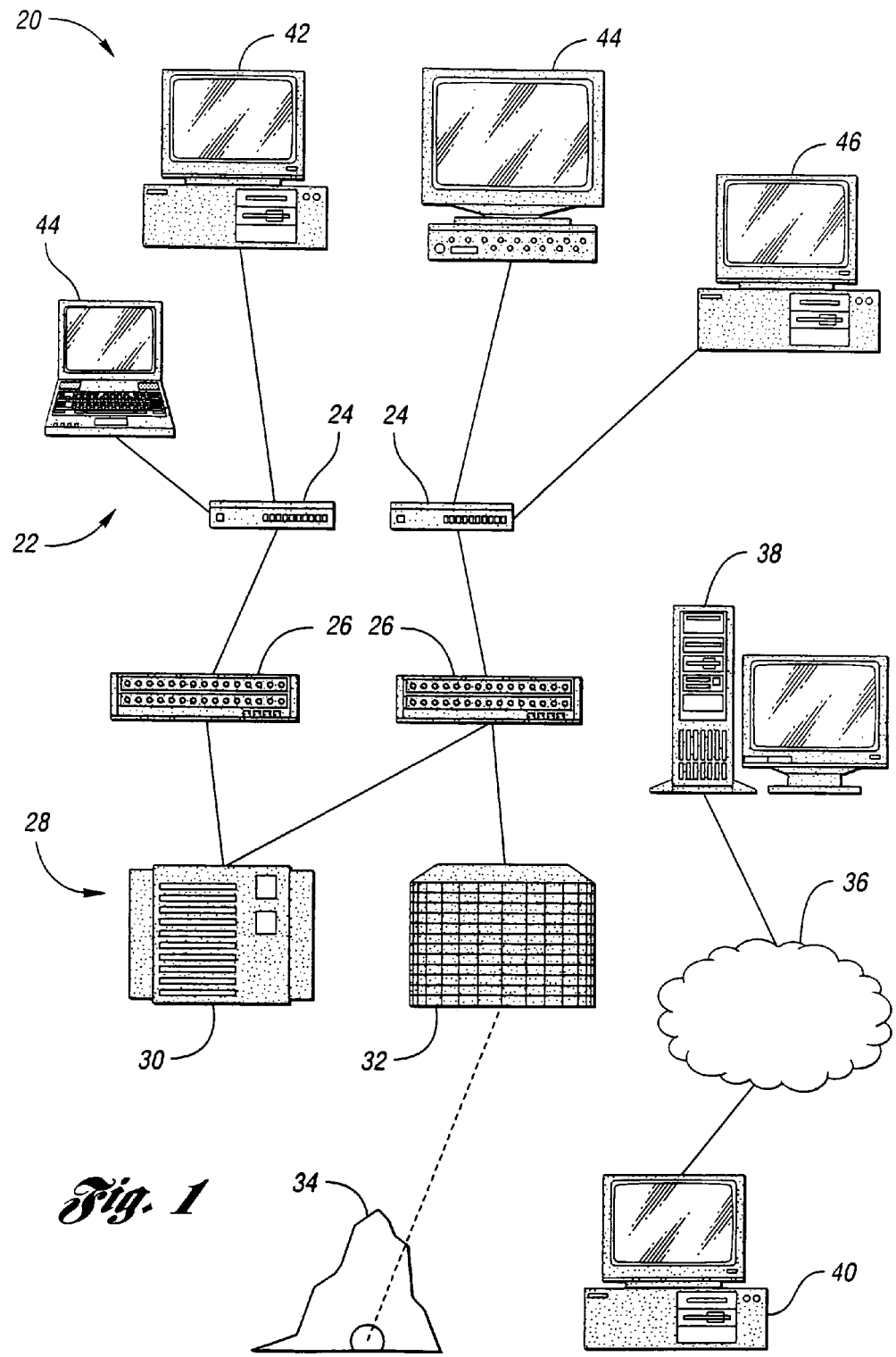
FIG. 1 is a diagram of a computer network that may use the present invention.

Referring now to FIG. 1, a diagram of a computer network that may use the present invention is shown. Computer network 20 includes a plurality of clients, shown generally by 22. Clients 22 may include users working on a computer which is part of computer network 20, application programs running on computers which are part of computer network 20 accessing information on behalf of a user, and automated systems which are part of computer network 20. Client systems 22 are interconnected through hubs 24 and routers 26 to form computer network 20.

Also connected to computer network 20 may be one or more storage systems, shown generally by 28, which may include disk array 30 and tape library 32. Magnetic disk storage devices in disk array 30 permit fast access to information but have a relatively high cost per bit. Magnetic tape in cartridges, cassettes, and reels are loaded into tape units for access of information in tape library 32. Tape storage devices have a lower cost per storage bit and a slower access rate. Further, for archival or back-up purposes, information stored on magnetic tapes may be removed from tape library 32 and sent to tape storage 34 from where the information is no longer directly accessible by clients 22.

Computer network 20 may also include access to public network 36, such as the Internet, through firewall 38. Firewall 38 limits access by external client 40 to clients 22 and storage systems 28.

The ability to create and share information within a limited group of clients 22 presents interesting challenges in the design of computer network 20. For example, producer client 42 develops information to be shared with consumer clients 44. The information is kept on one or more storage devices in one or more storage systems 28. While firewall 38 may inhibit external client 40 from accessing the information, firewall 38 does not affect excluded client 46.

Another design challenge is the ability to permit access to information based on combinations of groups of clients 22. A group may be defined as those clients 22 which share a common mandate. For example, possible groups may be all members of the financial department, members of the Board of Directors, software engineers assigned to project X, and the like. It is desirable to permit access to information based on combinations of groups such as, for example, clients which are either members of the Board of Directors or are members of both project X and are senior software engineers. Another useful form of description is to permit access to any client which is a member of M-of-N groups. For example, a client 22 may be granted access if it is a member of any two-of-three groups, Group 1, Group 2, and Group 3. It will be recognized that one of ordinary skill in the art can express access to information as a boolean combination of groups. A group asserts true in the boolean combination when consumer client 44 which is a member of the group requests access to the information set protected by the access formula. Consumer client 44 may then be granted access to the information if the access formula resultant is true.

Figure 2:
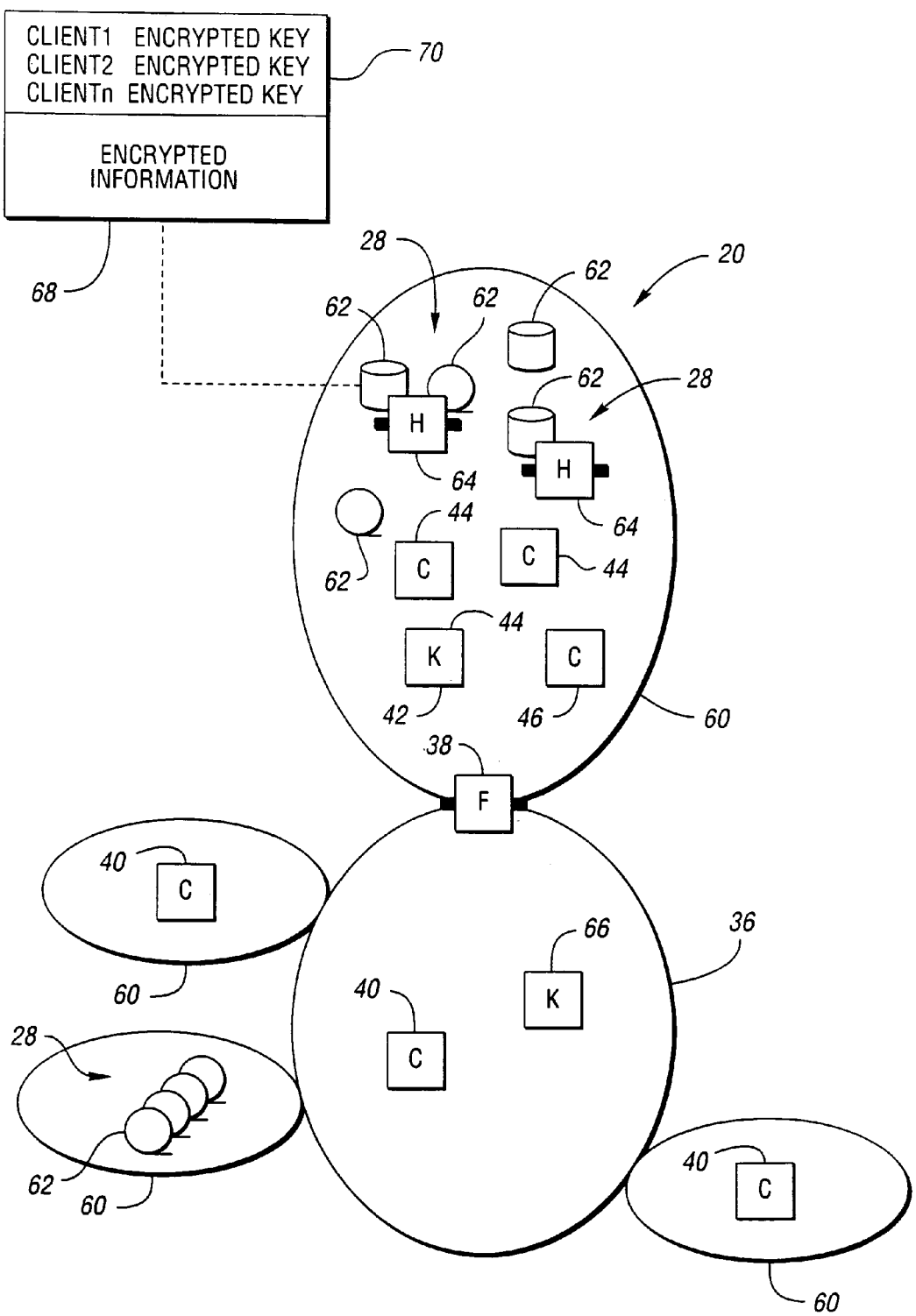
FIG. 2 is a conceptualized diagram of a prior network system for protecting stored information.

Referring now to FIG. 2, a conceptualized diagram of a prior network system for protecting stored information is shown. Firewall 38 protects elements within enclave 60 such as clients 22 and storage systems 28 from attack from unauthorized external client 40 attached to public network 36. To prevent excluded client 46 within enclave 60 from accessing storage device 62 within storage system 28, accesses to storage device 62 must pass through host 64. Host 64 implements some form of authentication, such as password protection, to determine if client 22 is permitted to access information stored on storage device 62.

While host 64 may deter excluded client 46 from accessing information, system managers and technicians responsible for host 64 and storage system 28 may still obtain unauthorized access to information. To prevent information services personnel from accessing information, the information may be encrypted prior to writing onto storage device 62. In one technique, each client 22 obtains a public key and matching private key from, for example, key server 66. Producer client 42 sends the information to host 64. Host 64 encrypts the information using a symmetric key and writes the encrypted information into data set 68. Host 64 then obtains the public key for each consumer client 44 permitted access and encrypts the symmetric key using each public key. The encrypted symmetric key is associated with an identifier for each consumer client 44 in prefix 70 associated with data set 68. When consumer client 44 wishes to access the encrypted information in data set 68, host 64 obtains the private key for requesting consumer client 44, decrypts the encrypted symmetric key using the private key, decrypts the encrypted information, and forwards the information to consumer client 44.

While this technique protects information from excluded clients 46 as well as information system personnel, it presents several difficulties. First, host 64 must have access to the private keys of consumer clients 44. This creates the opportunity for a private key to be intercepted and used by excluded client 46. A second difficulty occurs if prefix 70 is included with data set 68 or is managed in conjunction with data set 68. If data set 68 is written to magnetic tape which is subsequently sent to tape storage 34, the group of consumer clients 44 permitted to access the information cannot be changed without retrieving prefix 70. A third difficulty arises if a new member to the group of consumer clients 44 allowed to access the information is desired. Host 64 must obtain the private key of consumer client 44, decrypt the encrypted symmetric key, then reencrypt the symmetric key using the public key for the new consumer client 44. Once again, a private key for consumer client 44 must be given to host 64. A fourth difficulty is that the list of consumer clients 44 in prefix 70 does not support access specified by combinations of client groups. A fifth difficulty is that data transferred between clients 42, 44 and host 64 is not encrypted, requiring that the portions of network 20 connecting clients 42, 44 to host 64 be secure. A sixth difficulty arises in projects that may contain many sets of information. Prefix 70 for each data set 68 must be modified if consumer client 44 is removed from the list of clients 22 permitted access.

Figure 3:
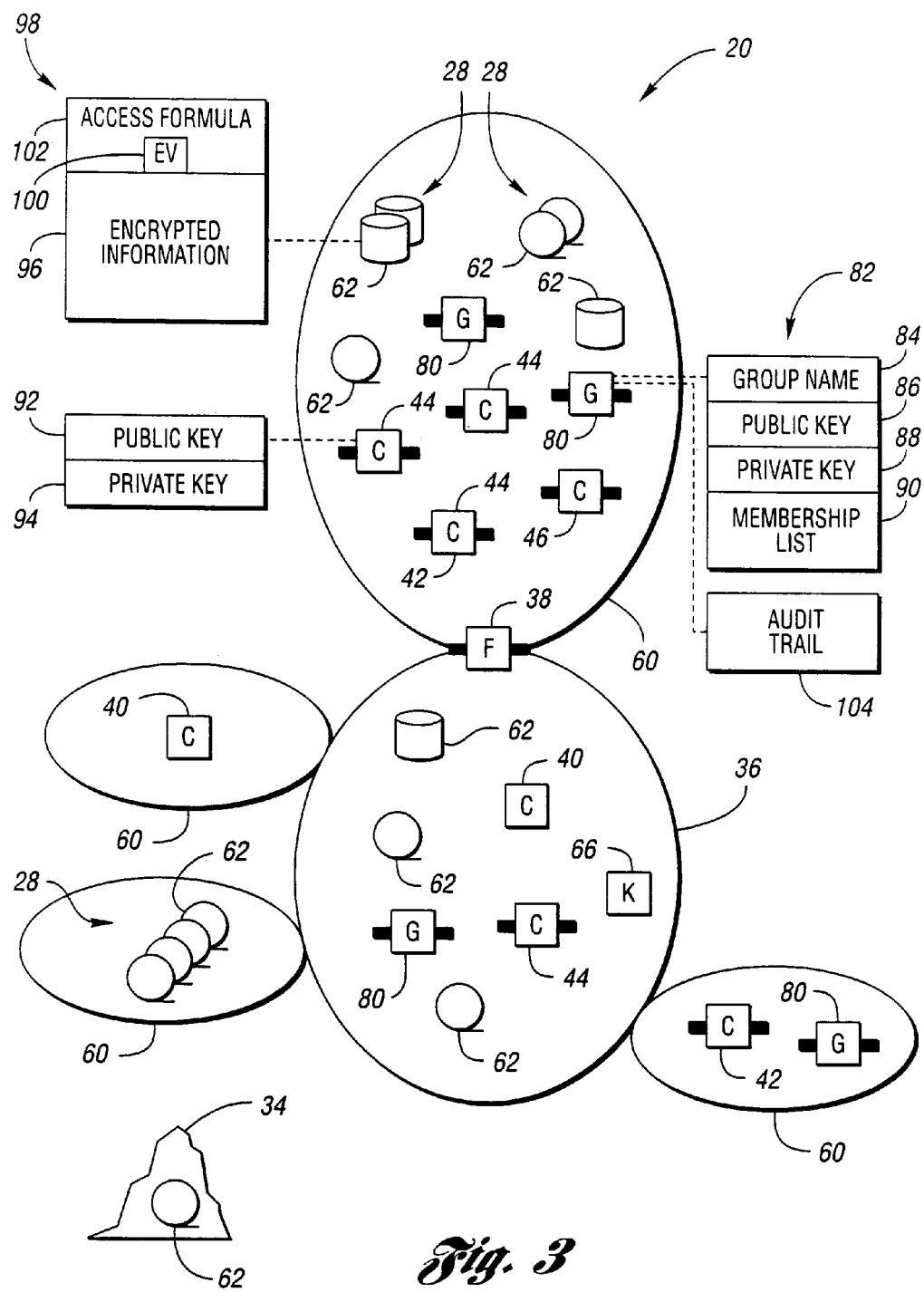
FIG. 3 is a conceptualized diagram of a networked computer system for protecting shared information according to the present invention.

Referring now to FIG. 3, a conceptualized diagram of a network computer system for protecting shared information according to the present invention is shown. Computer system 20 includes clients 22 and storage devices 62 which may be part of storage system 28. Storage devices 62 need not be protected by a host such as host 64. Therefore, storage device 62 is considered an untrusted storage device. Network 20 also includes at least one group server 80. Each group server 80 defines one or more groups, one of which is shown generally by 82. Each group 82 includes group name 84 identifying group 82. Each group 82 also includes group public key 86 and matching group private key 88 obtained from, for example, key server 66. Each group 82 further includes membership list 90 containing a list of clients 22 belonging to group 82. Each client 22 which is part of the present invention obtains client public key 92 and matching client private key 94 from, for example, key server 66. Each client 22 which is part of the present invention is responsible for encrypting or decrypting information stored on untrusted storage device 62. Encrypted information 96 is stored on untrusted storage device 62 in a data set, shown generally by 98. Encrypted information 96 is encrypted by producer client 44 using a symmetric key known as the encryption value (EV) 100. Encryption value 100 can only be obtained by consumer client 44 by correctly solving access formula 102. Access formula 102 describes a function of groups 82 permitted to access encrypted information 96. Access formula 102 is created by producer client 42 and stored, together with encrypted encryption value 100, by producer client 42 in data set 98.

Access formula 102 permits a complex description of groups 82 and individual clients 22 permitted to access encrypted information 96. Also, since membership in groups 82 is maintained by group server 80 and not kept in data set 98, data set 98 need not be accessible by any client 22 in network 20 in order to change access rights to encrypted information 96. This permits storage device 62 containing data set 98 to be placed in, for example, tape storage 34 and still permit access rights to data set 98 to be modified. Further, for large projects containing many data sets 98, access to all data sets 98 may be modified by changing membership list 90 for group 82 used in access formula 102 for data sets 98 in the project.

Group server 80 may be maintained by a group agent. The group agent has authority to add and delete members from membership list 90 in groups 82 maintained by group server 80. Since the group agent may be a member of group 82 or a trusted member of a local department, there is less opportunity for unknown personnel, such as information services members, to gain unauthorized access to encrypted information 96.

Since information leaving producer client 42 remains encrypted until after the information is received by consumer client 44, either or both of producer client 42 and consumer client 44 may be outside of enclave 60 protected by firewall 38. Further, storage device 62 may also be located outside of enclave 60 protected by firewall 38. This creates opportunities not possible previous to the present invention. For example, producer client 42 or consumer client 44 may safely utilize public network 36 to access encrypted information 96 held within enclave 60 protected by firewall 38. Also, storage system 28 can supply the storage needs of a plurality of enclaves 60 connected to storage system 28 through public network 36.

In an embodiment of the present invention, group server 80 maintains audit trail 104. Group server 80 records all attempts to access encrypted information 96 through group 82 managed by group server 80 in audit trail 104. Audit trail 104 includes an indication of client 22 requesting access encrypted information 96. Audit trail 104 may be kept by group 82 including producer client 42, by group 82 including consumer client 44, or by both. Basing audit trail 104 on producer client 42 ensures that any access attempt by excluded client 46 is available to producer client 42.

In another embodiment of the present invention, producer client 42 and consumer client 44 can determine whether or not an information set destined for storage on untrusted storage device 62 is encrypted. If the information set has not been encrypted, storage on untrusted storage device 62 is prohibited. This may be accomplished by examining data set 98 to determine the presence of access formula 102 prior to writing data set 98 to untrusted storage device 62.

Examples of embodiments of the present invention are described with regard to FIGS. 4–12 below. FIGS. 4, 5, 7, 8, 10, and 12 show flow diagrams illustrating operation of embodiments of the present invention. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration. Also, FIGS. 6, 9, and 11 show schematic diagrams including clients 22, group servers 80, and storage devices 62 within network 20. It is understood that these network components may communicate through interconnection paths including local area networks, wide area networks, public networks such as the Internet, or by any other means. As will be recognized by one of ordinary skill in the art, the present invention does not depend on the protocols, mechanisms, or media by which network elements are interconnected.

Figure 4:
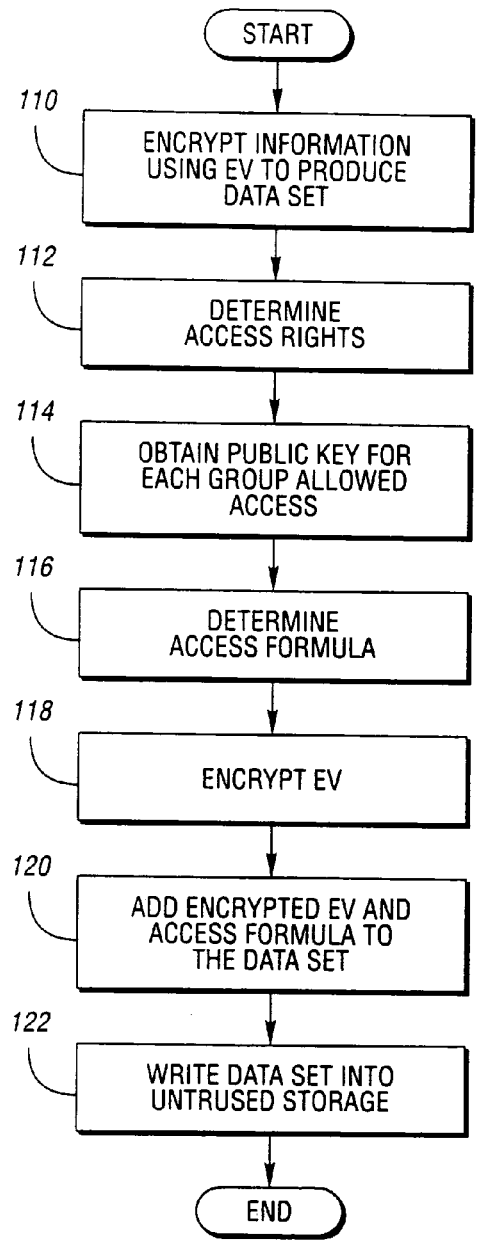
FIG. 4 is a flow diagram illustrating encryption of information by a producer client according to an embodiment of the present invention.

Referring now to FIG. 4, a flow diagram illustrating encryption of information by a producer client according to an embodiment of the present invention is shown. Information is encrypted using an encryption value to produce the data set in block 110. Producer client 42 obtains encryption value 100 and produces encrypted information 96. In a preferred embodiment, encryption value 100 is a randomly generated number and encrypted information 96 is produced through a symmetric cryptographic method. Symmetric cryptographic methods which may be used include those described above and other techniques known by one of ordinary skill in the art. Access rights are determined in block 112. A combination of clients 22 and groups of clients 82 to which access to encrypted information 96 will be granted is determined by producer client 42. This combination may include logical ANDing, logical ORing, and M-of-N descriptions. A public key for each group allowed access is obtained in block 114. Producer client 42 obtains group public key 86 for each group 82 granted access and client public key 92 for each client 22 directly granted access to encrypted information 96. Public keys 86,92 may be obtained in a variety of manners including querying a central source such as key server 66, querying a central database, and querying particular group servers 80 and clients 22.

An access formula is determined in block 116. Access formula 102, also known as an access control list or ACL, expresses a logical combination of groups 82 and clients 22 for which access to encrypted information 96 will be granted. Solution of access formula 102 indicates that consumer client 44 is either specified as client 22 directly granted to access encrypted information 96 in access formula 102 or is a member of group 82 granted access to encrypted information 96 by access formula 102.

The encryption value is encrypted in block 118. Encryption value 100 provides the key to encrypted information 96.

There are three basic methods that may be combined to generate access formula 102 and encryption value 100. First, if consumer client 44 is an individual or accesses a single group server 80, consumer client 44 is added to membership list 90 and encryption value 100 is encoded using client public key 92. Second, if M groups 82 or consumer clients 44 are required to agree before access is granted, encryption value 100 is split using an M-of-N method with each of the up to N key portions encoded using group public key 86 or client public key 92 as needed. Third, group server 80 may trust the sworn statement of another group server 80. In this case, consumer client 44 is validated by group server 80 to which it is a member. Group server 80 then vouches for consumer client 44 to another group server 80 which has access to encryption value 100. Following is an example of access formula 102:

```
<!-- Any one of the following options accesses the data: -->
<any m="1">
   <!-- Author may access own data -->
   <individual id="me@some_location.com" >
      <key data="12341234 12341234 12341234 12431234" />
   </individual>
   <!-- Or data may be accessed through the following group -->
   <group id="group 1">
      <key data="12341234 12341234 12341234 12431234" />
   </group>
   <!-- Or data may be accessed through the following groups in series -->
   <group id="group2">
      <group id="group3">
         <key data="12341234 12341234 12341234 12431234" />
      </group>
   </group>
</any>
```

-continued

```
<!-- Or half the key may be obtained from each of the following -->
<any m="2">
   <group id="group4">
      <key data="12341234 12341234 12341234 12431234" />
   </group>
   <group id="group5">
      <key data="12341234 12341234 12341234 12431234" />
   </group>
</any>
<-- Escrow -->
<any m="3">
   <individual id="Escrow1">
      <key data="12341234 12341234 12341234 12431234" />
   </>
   <individual id="Escrow2">
      <key data="12341234 12341234 12341234 12431234" />
   </>
   <individual id="Escrow3">
      <key data="12341234 12341234 12341234 12431234" />
   </>
   <individual id="Escrow4">
      <key data="12341234 12341234 12341234 12431234" />
   </>
   <individual id="Escrow5">
      <key data="12341234 12341234 12341234 12431234" />
   </>
   <individual id="Escrow6">
      <key data="12341234 12341234 12341234 12431234" />
   </>
</any>
</Escrow>
```

In the example, individual "me@some_location.com" or any member of the group1 project "proj1" can access encryption value 100. Any member of the group "group3" will be vouched for by group3 to group "group2". If group "group2" receives a proper vouch, encryption value 100 will be released to consumer client 44 which is a member of group3. Any consumer client 44 which is a member of both group "group4" and group "group5" may obtain two portions necessary to form encryption value 100. In this case, encryption value 100 is split using a 2-of-2 technique with each portion encoded to group4 and group5 respectively. Any three out of the six persons "Escrow1" through "Escrow6" may get access to the data escrow. Encryption value 100 is split using a 3-of-6 technique and encoded using client public key 92 for each individual.

The encrypted encryption value and access formula are added to the data set in block 120. Data set 98 now contains encrypted information 96 as well as access formula 102 describing which client 22 or combinations of clients 22 may access encrypted information 96. The data set can be written using untrusted data paths into untrusted storage in block 122. Producer client 42 writes data set 98 into untrusted storage device 62. Untrusted storage device 62 may include one or more magnetic disks, magnetic tapes, optical disks, programmable read-only memories, battery-backed read/write memories, other non-volatile storage devices, or any combination of the above. It will be understood by one of ordinary skill in the art that any media may be used to implement untrusted storage device 62 within the spirit and scope of the present invention.

Figure 5:
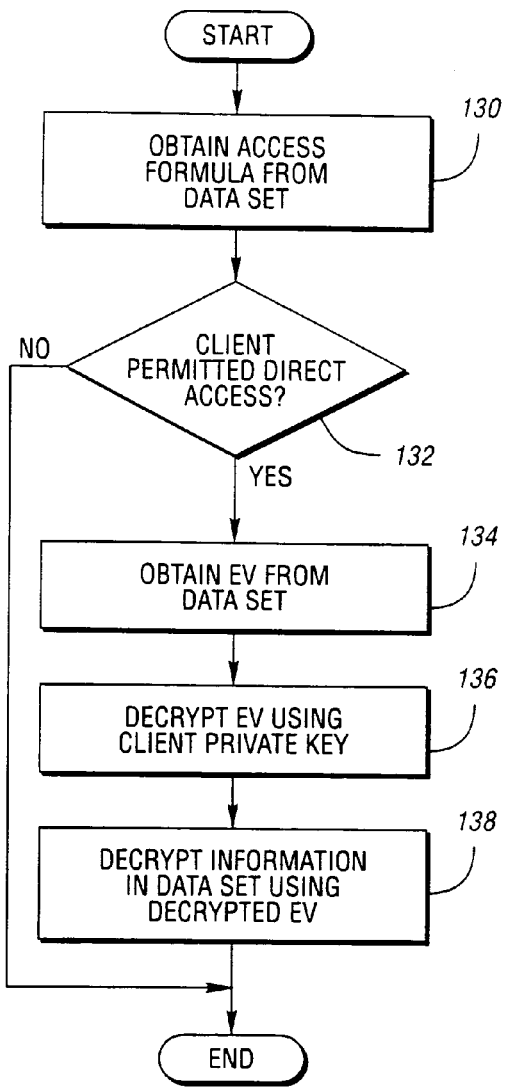
FIG. 5 is a flow diagram illustrating decrypting information by a consumer client which is granted direct access according to an embodiment of the present invention.

Referring now to FIG. 5, a flow diagram illustrating decrypting information by a consumer client which is granted direct access according to an embodiment of the present invention is shown. In this example, producer client 42 has expressed through access formula 102 that consumer client 44 has access to encrypted information 96 directly, without requiring consumer client 44 to be a member of any group 82.

The access formula is obtained from the data set in block 130. When consumer client 44 wishes to access encrypted information 96, consumer client 44 reads access formula 102 from data set 98. A check is made to determine if the client is permitted direct access in block 132. If consumer client 144 solves access formula 102, consumer client 44 can access encrypted information 96 without first having to access any group server 80. The encryption value is obtained from the data set in block 134. Consumer client 44 extracts encrypted encryption value 100 from data set 98. In order to grant consumer client 44 direct access to encrypted information 96, producer client 42 must have previously encrypted a copy of encryption value 100 using public key 92 for consumer client 44. Consumer client 44 decrypts encrypted encryption value 100 using private key 94 in block 136. Consumer client 44 can now access encrypted information 96 in data set 98 using decrypted encryption value 100 in block 138.

Referring now to FIG. 6, a schematic diagram of a consumer client, a group server supporting a group to which the consumer client is a member, and an untrusted storage device holding information that may be accessed by members of the group is shown. Untrusted storage device 62 includes data set 98 having encrypted information 96. Data set 98 also includes access formula 102 indicating that any member of group 82, named G1, may access encrypted information 96. Group server 80 supports group G1. Membership list 90 for group G1 indicates consumer client 44, named C1, is a member of group G1. Consumer client C1 can communicate with group server 80 through interconnection path 150 and can communicate with untrusted storage device 62 through interconnection path 152. Group server 80 can communicate with untrusted storage device 62 through interconnection path 154.

Referring now to FIG. 7, a flow diagram illustrating operation of a group server in response to an access request according to an embodiment of the present invention is shown. With reference also to FIG. 6, an example of the operation of group server 80 will now be described.

A request is received from a client to access information in block 160. Group server 80 receives a request from consumer client 44 through interconnection path 150 to access encrypted information 96 stored in untrusted storage device 62. Group server 80 accesses unprotected storage device 62 through interconnection path 154 and reads access formula 102 in block 162.

A check is made to determine if the client is authorized to access information in block 164. Group server 80 examines access formula 102 and determines that membership in group G1 will grant access to encrypted information 96. Group server 80 then searches membership list 90 to determine if requesting consumer client 44 is a member of group G1. If requesting consumer client 44 is a member, the method proceeds in block 168. If requesting consumer client 44 is not a member of group G1, access to encrypted information 96 is denied. In an embodiment of the present invention, a message is sent through interconnection path 150 indicating that access is denied to the requesting client in block 166.

If access is granted, the encryption value is decrypted using the group private key in block 168. Group server 80 uses group private key 88 to decrypt encryption value 100. Group server 80 reencrypts encryption value 100 using client public key 92 for requesting consumer client 44 in block 170. Note that, since only the true requesting consumer client 44 known as C1 has matched client private key. 94, an imposter client 22 cannot obtain encrypted information 96 by posing as client C1 to group server 80. Group server 80 forwards reencrypted encryption value 100 to requesting consumer client 44 using interconnection path 150 in block 172.

Figure 8:
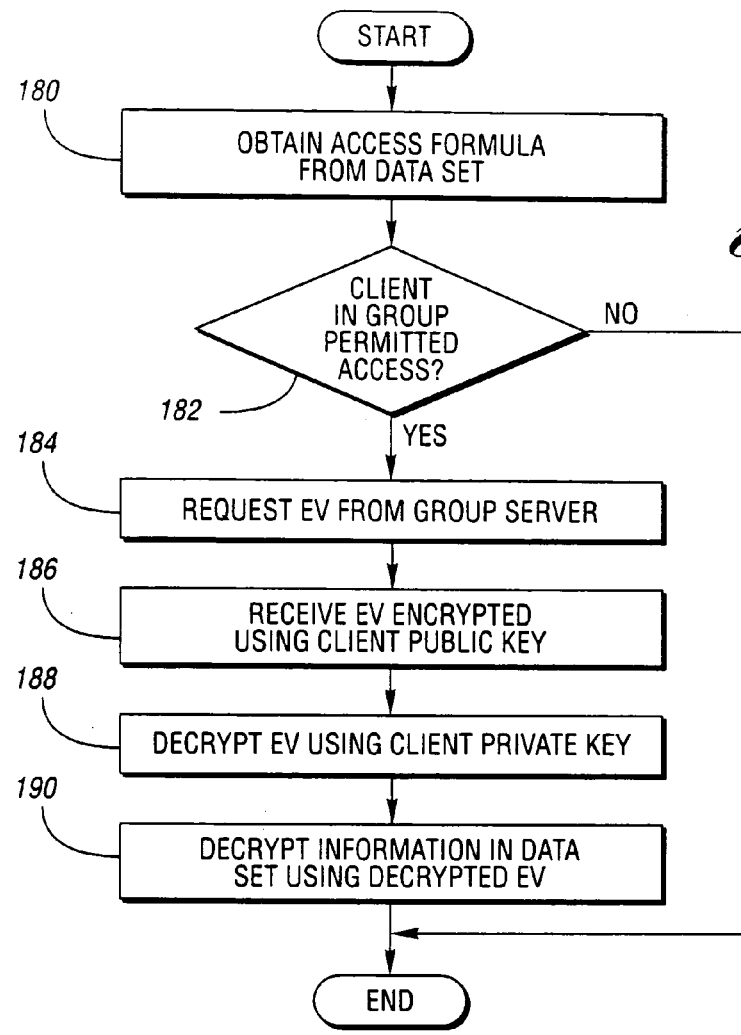
FIG. 8 is a flow diagram illustrating operation of a consumer client which is a member of a group solving the access formula required to access encrypted information.
Figure 9:
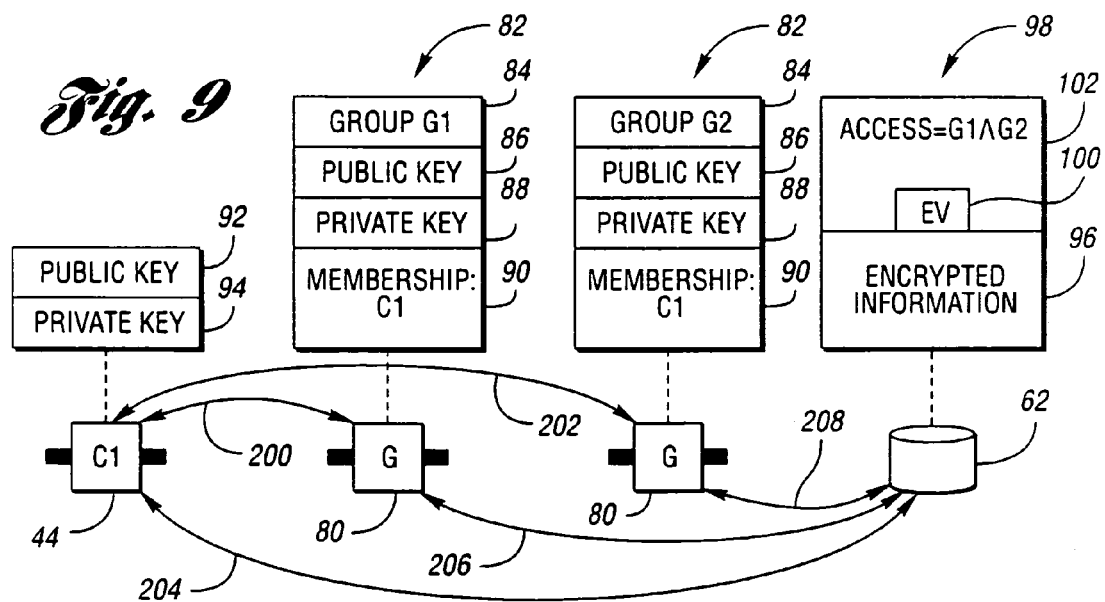
FIG. 9 is a schematic diagram of a consumer client, two group servers each supporting a group to which the consumer client is a member, and an untrusted storage device holding information that may be accessed by members of both groups.

Referring now to FIG. 8, a flow diagram illustrating operation of a consumer client which is a member of a group solving the access formula required to access encrypted information is shown. With reference also to FIG. 6, an example of requesting consumer client 44 operation will now be provided.

Requesting consumer client 44 obtains access formula 102 from data set 98 in untrusted storage device 62 using interconnection path 152 in block 180. A check is made to determine if client 44 is in a group permitting access in block 182. In this example, any client 22 which is a member of group 82 named G1 may access encrypted information 96.

Requesting consumer client 44 examines access formula 102 and proceeds to block 184 if requesting consumer client 44 is a member of group G1. If not, additional terms of access formula 102, not shown for clarity, may be examined. The operation of client 44 when more than one group membership is required for access is described with regards to FIGS. 9 through 12 below.

Requesting consumer client 44 may query group server 80 to determine if requesting consumer client 44 is a member of group G1. Alternately, requesting consumer client 44 may wait for a response to the request for encryption value 100 to determine if requesting consumer client 44 is a member of group G1.

The encryption value is requested from the group server in block 184. Requesting consumer client 44 sends a request for encryption value 100 to group server 80 using interconnection path 150. If requesting consumer client 44 is a member of group G1, requesting consumer client 44 receives encryption value 100 encrypted by group server 80 using client public key 92 as in block 186. Requesting consumer client 44 then decrypts encryption value 100 using client private key 94 in block 188. Consumer client 44 may then access encrypted information 96 through interconnection path 152 and decrypt the accessed encrypted information 96 using decrypted encryption value 100 in block 190.

Referring now to FIG. 9, a schematic diagram of a consumer client, two group servers each supporting a group to which the consumer client is a member, and an untrusted storage device holding information that may be accessed by members of both groups is shown. Untrusted storage device 62 contains data set 98 with encrypted information 96 and access formula 102. Access formula 102 indicates that membership in two groups 82, namely G1 and G2, is required to access encrypted information 96. In this example, two group servers 80 each contain the description of one group 82 required to access encrypted information 96. Requesting consumer client 44 is connected to group servers 80 through interconnection paths 200,202 and is connected to untrusted storage device 62 through interconnection path 204. Untrusted storage device 62 is connected to group servers 80 through interconnection paths 206,208. The operation of each group server 80 is similar to the method described with regards to FIG. 5 above.

Figure 10:
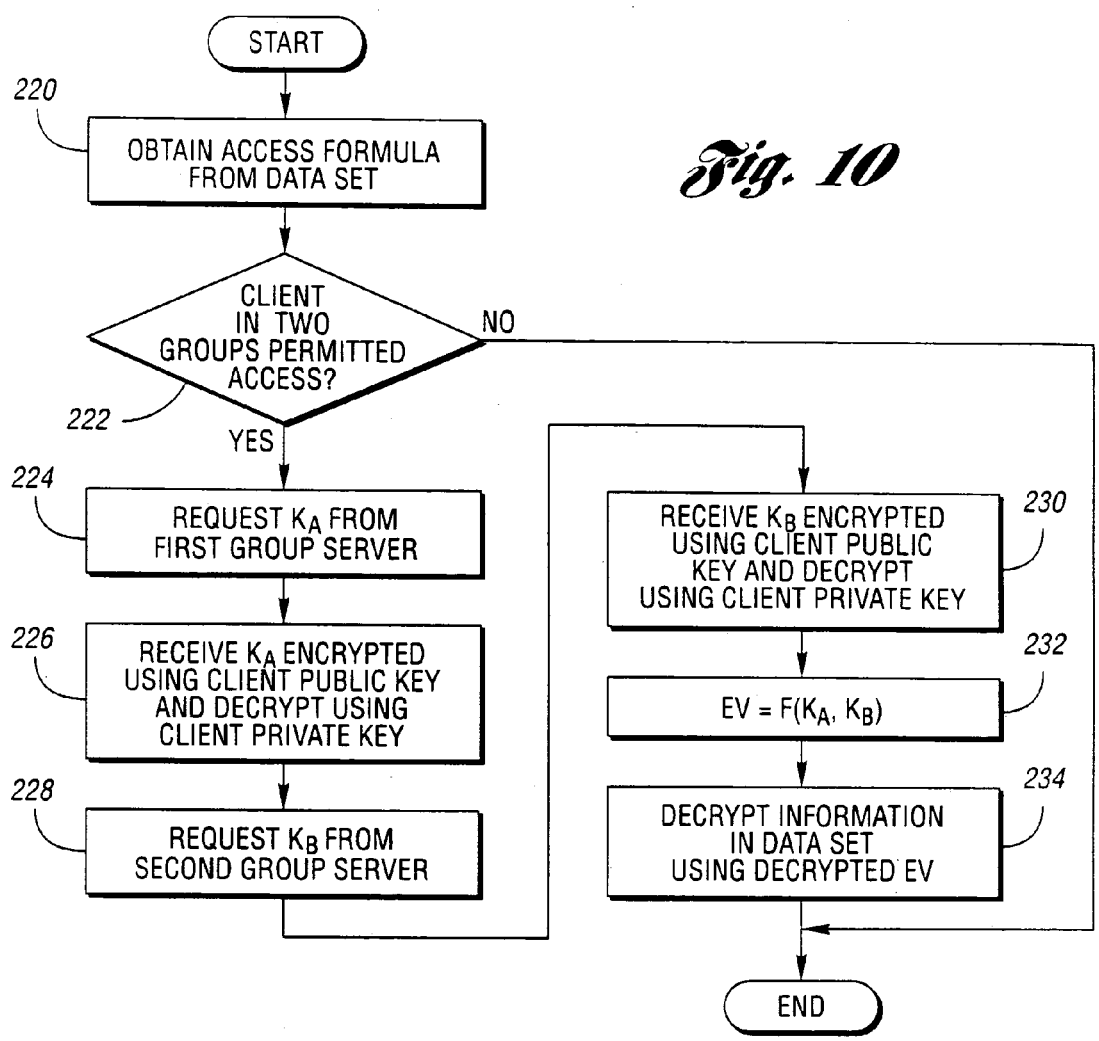
FIG. 10 is a flow diagram illustrating operation of a consumer client which is a member of two groups solving the access formula required to access encrypted information.
Figure 11:
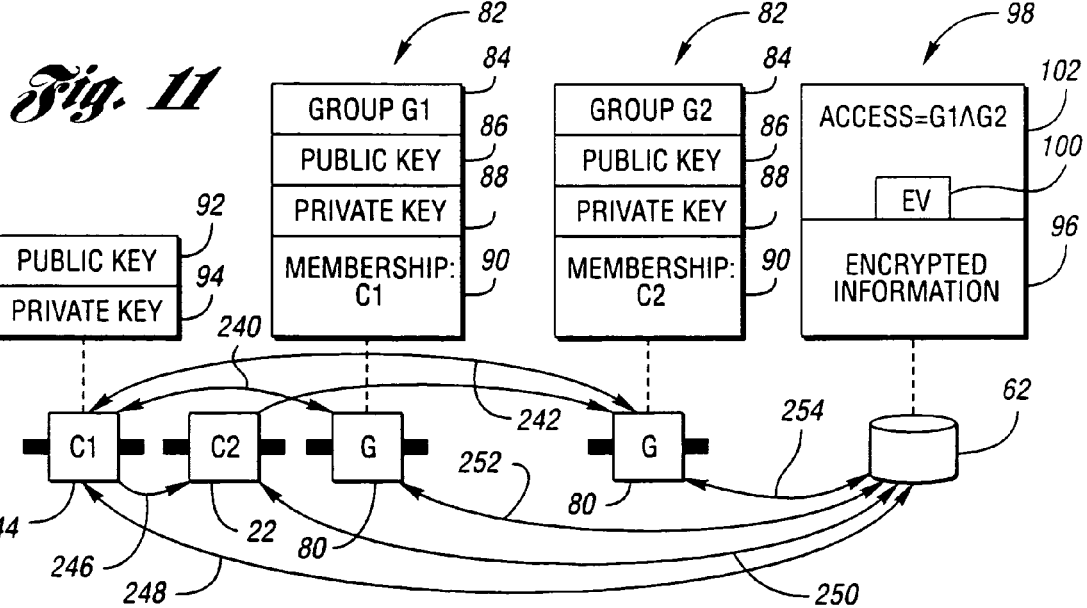
FIG. 11 is a schematic diagram of two consumer clients, two group servers each supporting a group to which one of the clients is a member, and an untrusted storage device holding information that may be accessed by members of both groups.

Referring now to FIG. 10, a flow diagram illustrating operation of a consumer client which is a member of two groups solving the access formula required to access encrypted information is shown. With reference also to FIG. 9, requesting consumer client 44 is a member of two groups 82 required to solve access formula 102. Encryption value 100 is split into two pieces or partial keys, both of which are required to access encrypted information 96, one partial key corresponding to each group 82 which solves access formula 102. In order to access encrypted information 96, requesting consumer client 44 must have both portions of encryption value 100.

Requesting consumer client 44 obtains access formula 102 from data set 98 stored on untrusted storage device 62 through interconnection path 204 in block 220. A check is made to determine if requesting consumer client 44 is a member of both groups 82 required by access formula 102 in block 222. If at any time during the present method it is determined that requesting consumer client 44 is not a member of either groups 82 required to solve access formula 102, the method is ended. Requesting consumer client 44 requests the first portion of encryption value 100, $K_A$, from group server 80 defining group G1 using interconnection path 200 in block 224. Requesting consumer client 44 receives $K_A$ encrypted by group server 80 for group G1 using client public key 92 and decrypts $K_A$ using client private key 94. Requesting client 44 also requests the second portion of encryption value 100, $K_B$, from group server 80 defining group G2 using interconnection path 202 in block 228. Requesting consumer client 44 receives $K_B$ encrypted by group server 80 for group G2 using client public key 92 and decrypts $K_B$ using client private key 94. Requesting consumer client 44 forms encryption value 100 by combining partial keys $K_A$ and $K_B$ in block 232. Consumer client 44 may then access encrypted information 96 on untrusted storage device 62 through interconnection path 204 and decrypt encrypted information 96 using decrypted encryption value 100 in block 234.

Referring now to FIG. 11, a schematic diagram of two consumer clients, two group servers each supporting a group to which one of the clients a member, and an untrusted storage device holding information that may be accessed by members of both groups is shown. Untrusted storage device 62 includes data set 98 having encrypted information 96 which can only be accessed by client 22 which is a member of two groups 0.82, G1 and G2, as indicated by access formula 102. Each of two group servers 80 contain the definition of one group 82 required to access encrypted information 96. Requesting consumer client 44, C1, is a member of one group 82 required to access encrypted information 96, namely group G1, but is not a member of the second group, namely group G2. A second client 22, C2, is a member of group G2. Client C1 communicates with group server 80 having group G1 to which it is a member using interconnection path 240 and to group server 80 having group G2 to which it is not a member using interconnection path 242. Client C2 communicates to client C1 through communication path 244 and communicates to group server 80 having group G2 to which it is a member through interconnection path 246. Untrusted storage device 62 may communicate with client C1 through interconnection path 248, with client C2 through interconnection path 250, and with group servers 80 through interconnection paths 252, 254.

Figure 12:
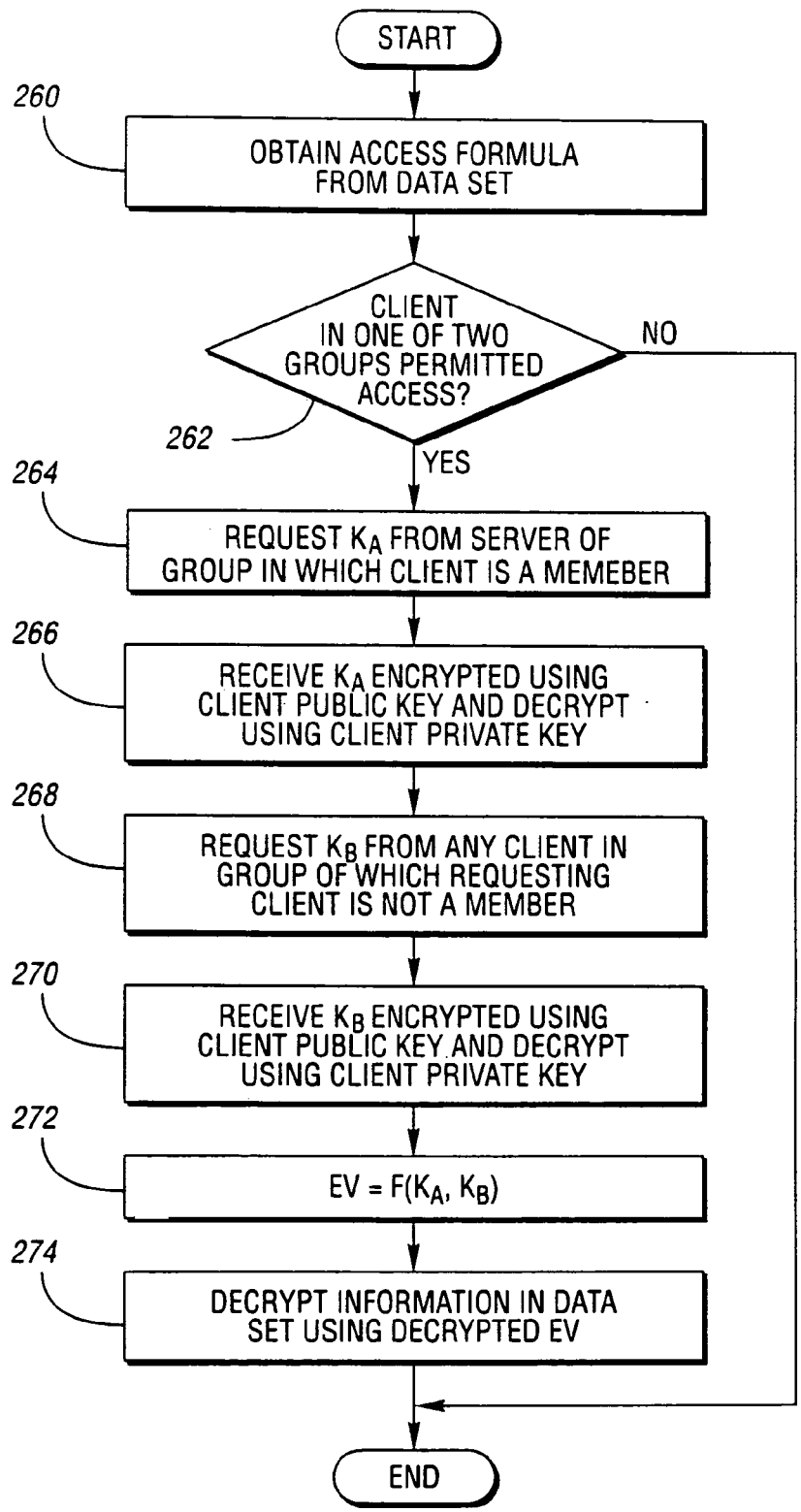
FIG. 12 is a flow diagram illustrating operation of a consumer client which is a member of one of two groups solving the access formula required to access encrypted information.

Referring now to FIG. 12, a flow diagram illustrating operation of a consumer client which is a member of one of two groups solving the access formula required to access encrypted information is shown. Referring as well to FIG. 11, requesting consumer client 41, indicated by C1, desires access to encrypted information 96 stored in data set 98 on untrusted storage device 62. Access formula 102, also in data set 98, indicates that membership in both groups G1 and G2 is required to access encrypted information 96. Client C1 obtains access formula 102 from data set 98 using interconnection path 248 in block 260. Client C1 determines that client C is a member of group G1 but is not a member of group G2 in block 262. This determination may be made prior to requesting portions of encryption value 100 or as a result of requesting portions of encryption value 100.

Client C1 requests a portion of encryption value 100, $K_A$, from group server 80 defining group G1 of which client C1 is a member through interconnection path 240 in block 264. Client C1 receives $K_A$ encrypted by group server 80 using client public key 92 and decrypts $K_A$ using client private key 94 in block 266. Client C1 also requests the second portion of encryption value 100, $K_B$, from client C2 which is a member of group G2 through interconnection path 246 in block 268. Client C1 may determine that client C2 is a member of group G2 by querying group server 80 defining group G2 through interconnection path 242. If client C2 decides to intercede on behalf of client C1, client C2 requests that group server 80 forward KB to client C1 using interconnection path 246. After verifying that client C2 is a member of group G2, group server 80 decrypts $K_B$ using group G2 private key 88, encrypts $K_B$ using client C1 public key 92, and sends reencrypted $K_B$ to client C1 using interconnection path 242. Client C1 receives $K_B$ and decrypts $K_B$ using client private key 94 in block 270.

Client C1 forms encryption value 100 using partial keys KA and KB in block 272. Client C1 may then access encrypted information 96 on untrusted storage device 62 using interconnection path 248 and decrypt encrypted information 96 using decrypted encryption value 100.

In an alternative embodiment, client C1 contacts group server 80 defining group G2 with the request for $K_B$ in block 268. Group server 80 defining group G2 then contacts client C2 which is a member of group G2 to determine if client C2 will permit client C1 to access encrypted information 96. If client C2 permits client C1 access to encrypted information 96, group server 80 decrypts partial key $K_B$ using group G2 private key 88, encrypts $K_B$ using client C1 public key 92, and sends client C reencrypted partial key $K_B$ using interconnection path 242.

The examples provided with regard to FIGS. 4–12 above are meant to illustrated the operation of the present invention and should not be interpreted as restricting the present invention. Groups 82 shown on different group servers 80 may be on the same group server 80. Examples showing two groups 82 may be obviously extended to three or more groups 82. Also, client 22 may function as one or more of producer client 42, consumer client 44, excluded client 46, key server 66, and group server 80.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method for the secure handling of information encrypted to a data set, the information requested by a requesting consumer client, the data set stored on at least one storage device, the method comprising decrypting a value required to decrypt the information, the value decrypted by correctly solving an access formula describing a function of groups, each group comprising a list of at least one client, wherein the requesting consumer client is granted access to the information if the requesting consumer client is a member of at least one group which correctly solves the access formula.

2. A method for the secure handling of information as in claim 1 wherein the encrypted value and the access formula are stored as metadata in the data set.

3. A method for the secure handling of information by at least one client using at least one untrusted storage device, each client connected to the at least one untrusted storage device using a network, the network further having a key manager for issuing private key and public key matched pairs for use with an asymmetric encryption and decryption scheme, the scheme allowing a file encrypted with a public key to be decrypted only with a matched private key, the method comprising:

creating at least one group, each group comprising a list of at least one consumer client;

acquiring a public key and a matched private key for each of the at least one group;

encrypting an information set to produce a data set, the encryption based on a randomly generated number;

determining an access formula expressing logical combination of the at least one group for which access to the information set will be granted, solution of the access formula by at least one solution group indicating that a consumer client belonging to the at least one solution group may access the encrypted information set;

asymmetrically encrypting the randomly generated number using the determined access formula and the public key for each of the at least one group granted access to the information set;

adding the encrypted randomly generated number to the data set; and storing the data set on at least one untrusted storage device.

4. A method for the secure handling of information as in claim 3 wherein a consumer client having a public key and a matched private key requests access to information encrypted in the stored data set, the method further comprising:

receiving a request from the consumer client;

determining if the consumer client belongs to at least one solution group which solves the access formula and, if not, denying access;

otherwise, decrypting the randomly generated number using the private key for the at least one determined solution group; and encrypting the randomly generated number using the public key for the consumer client thereby permitting access to the encrypted information set by the consumer client.

5. A method for the secure handling of information as in claim 4 further comprising recording all attempts to access the information set in an audit trail, the audit trail including an indication of the consumer client requesting access.

6. A method for the secure handling of information as in claim 3 wherein a plurality of groups form a solution to the access formula, asymmetrically encrypting the randomly generated number creating an encrypted partial key for each group in the plurality of groups, each partial key encrypted using the public key for one group in the plurality of groups, each partial key required to decrypt the encrypted randomly generated number, the method further comprising:

for each group in the plurality of groups, decrypting the encrypted partial key using the private key for the group;

for each group in the plurality of groups, reencrypting the decrypted partial key using the public key for a requesting client;

decrypting each reencrypted partial key using the private key of the requesting client;

determining the randomly generated number based on each partial key; and decrypting the information set using the determined randomly generated number.

7. A method for the secure handling of information as in claim 3 wherein the access formula is a boolean combination of groups, a group asserting true in the boolean combination when a consumer client member of the group requests access to the information set protected by the access formula, the consumer client group member granted access if the access formula resultant is true.

8. A method for the secure handling of information as in claim 3 further comprising:

determining that an information set destined for storage on at least one untrusted storage device is encrypted; and prohibiting storage on the at least one untrusted storage device if the information set is determined not to be encrypted.

9. A system for the secure handling of information stored on at least one untrusted storage device connected to a network comprising:

a key manager connected to the network, the key manager operable to generate private key and public key matched pairs for use with an asymmetric encryption and decryption scheme, the scheme allowing a file encrypted with a public key to be decrypted only with a matched private key;

at least one group server connected to the network, each group server operable to (a) maintain at least one group, each group comprising a list of client members allowed access to information produced by any client member of the group, and (b) obtain a private key and matched public key for each group; and at least one producer client connected to the network, the producer client operative to (a) encrypt an information set to produce a data set, the encryption based on an encryption value, (b) determine an access formula expressing logical combination of the at least one group for which access to the information set will be granted, solution of the access formula by at least one solution group indicating that a client belonging to the at least one solution group may access the encrypted information set, (c) asymmetrically encrypt the encryption value using the determined access formula and the public key for each of the at least one group for which access to the information set may be granted, (d) add the encrypted encryption value and the access formula to the data set, and (e) store the data set on at least one untrusted storage device.

10. A system for the secure handling of information as in claim 9 wherein the encryption value comprises a randomly generated number.

11. A system for the secure handling of information as in claim 9 wherein the access formula is a boolean combination of groups, a group asserting true in the boolean combination when a client member of the group requests access to the information set protected by the access formula, the client member granted access if the access formula resultant is true.

12. A system for the secure handling of information as in claim 9 wherein the producer client is further operable to
determine that an information set destined for storage on at least one untrusted storage device is encrypted; and
prohibit storage on to the at least one untrusted storage device if the information set is determined not to be encrypted.

13. A system for the secure handling of information as in claim 9 further comprising at least one consumer client connected to the network, each consumer client operative to
obtain a private key and a matched public key;
determine that an accessed data set has encrypted information;
determine at least one group server maintaining at least one group from the access formula logical combination, the at least one group forming a solution to the access formula;
send a request to access the encrypted information set to each of the at least one determined group server;
if access is granted from each of the determined at least one group server, decrypt the encryption value using the obtained private key; and
decrypt the encrypted information set using the decrypted encryption value.

14. A system for the secure handling of information as in claim 13 wherein the at least one group is a plurality of groups and wherein the producer client asymmetrically encrypts the encryption value to produce a partial key for each group in each set of groups forming a solution to the access formula, the consumer client further operative to decrypt the encryption value by decrypting each partial key and to determine the encryption value based on each decrypted partial key.

15. A system for the secure handling of information as in claim 13 wherein each group server is further operable to
receive a request from a requesting consumer client;
determine if the requesting consumer client belongs to at least one solution group which solves the access formula and, if not, deny access;
otherwise, decrypt the encryption value using the private key for the at least one determined solution group; and
encrypt the encryption value using the public key for the requesting consumer client thereby permitting access to the encrypted information set by the consumer client.

16. A system for the secure handling of information as in claim 13 wherein each group server is further operable to record all attempts to access each information set in an audit trail, the audit trail including an indication of the consumer client requesting access.

17. A system for the secure handling of information as in claim 13 wherein each group server is further operable to permit additions, deletions, and changes to each group list of client members.

* * * * *